United States Patent Office 3,188,020
Patented June 8, 1965

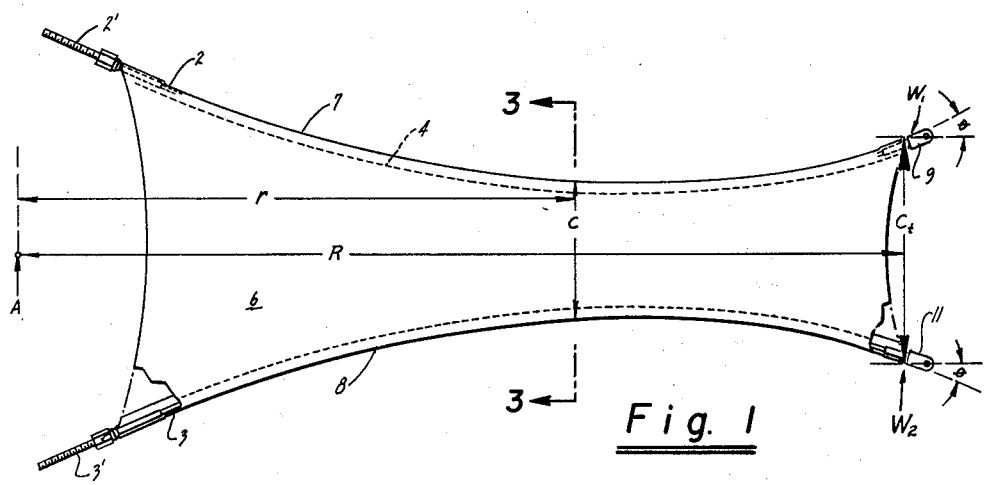
Fig. 1
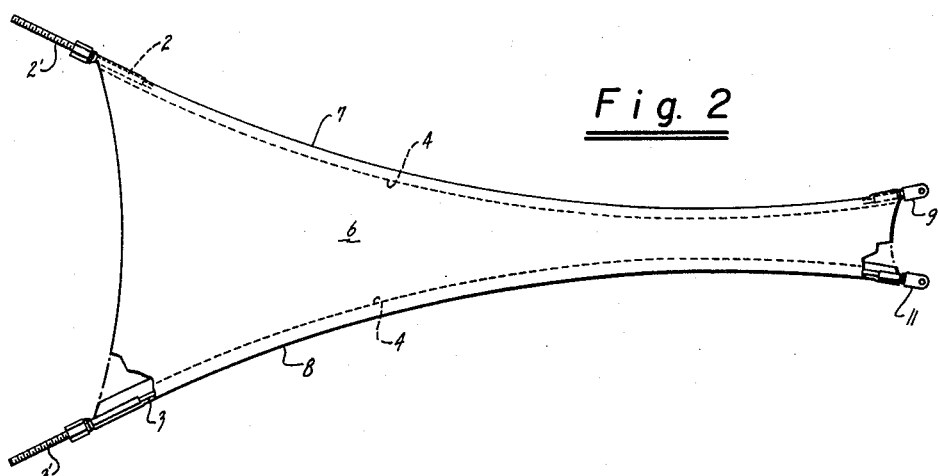
Fig. 2
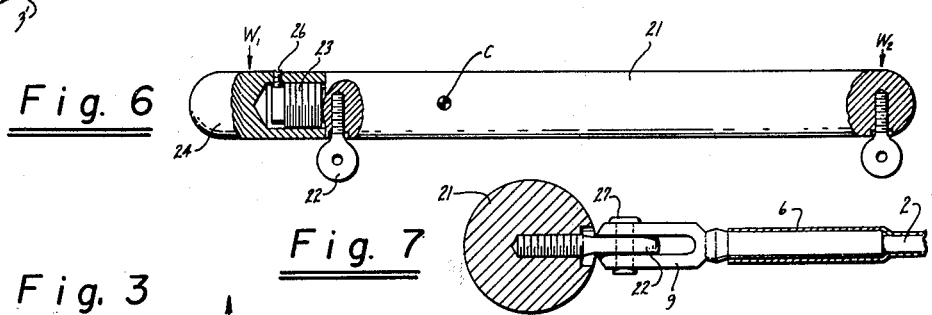
Fig. 6
Fig. 7
Fig. 3
INVENTORS
Jack N. Nielsen
BY Jack A. Burnell
Attorneys

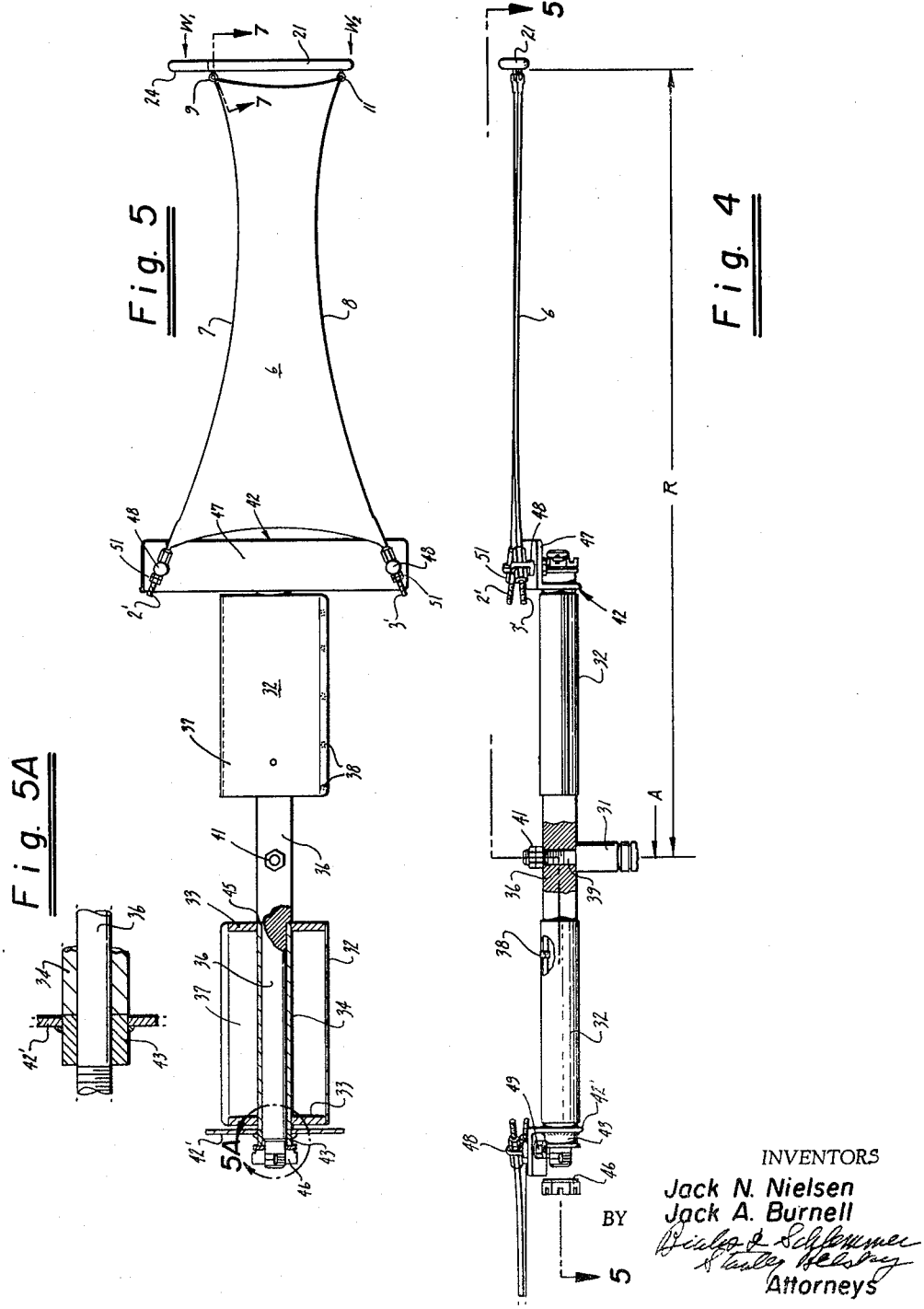

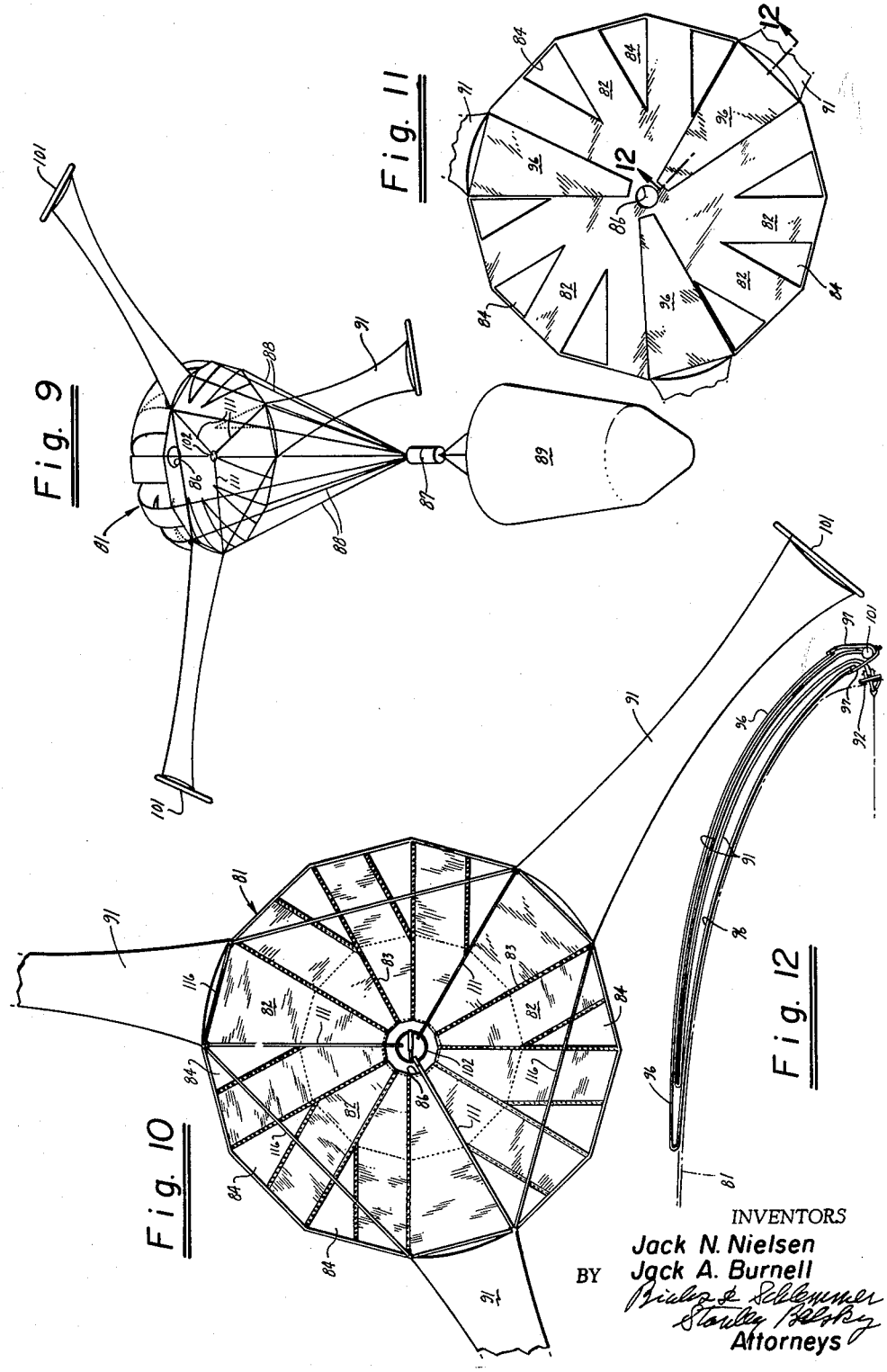

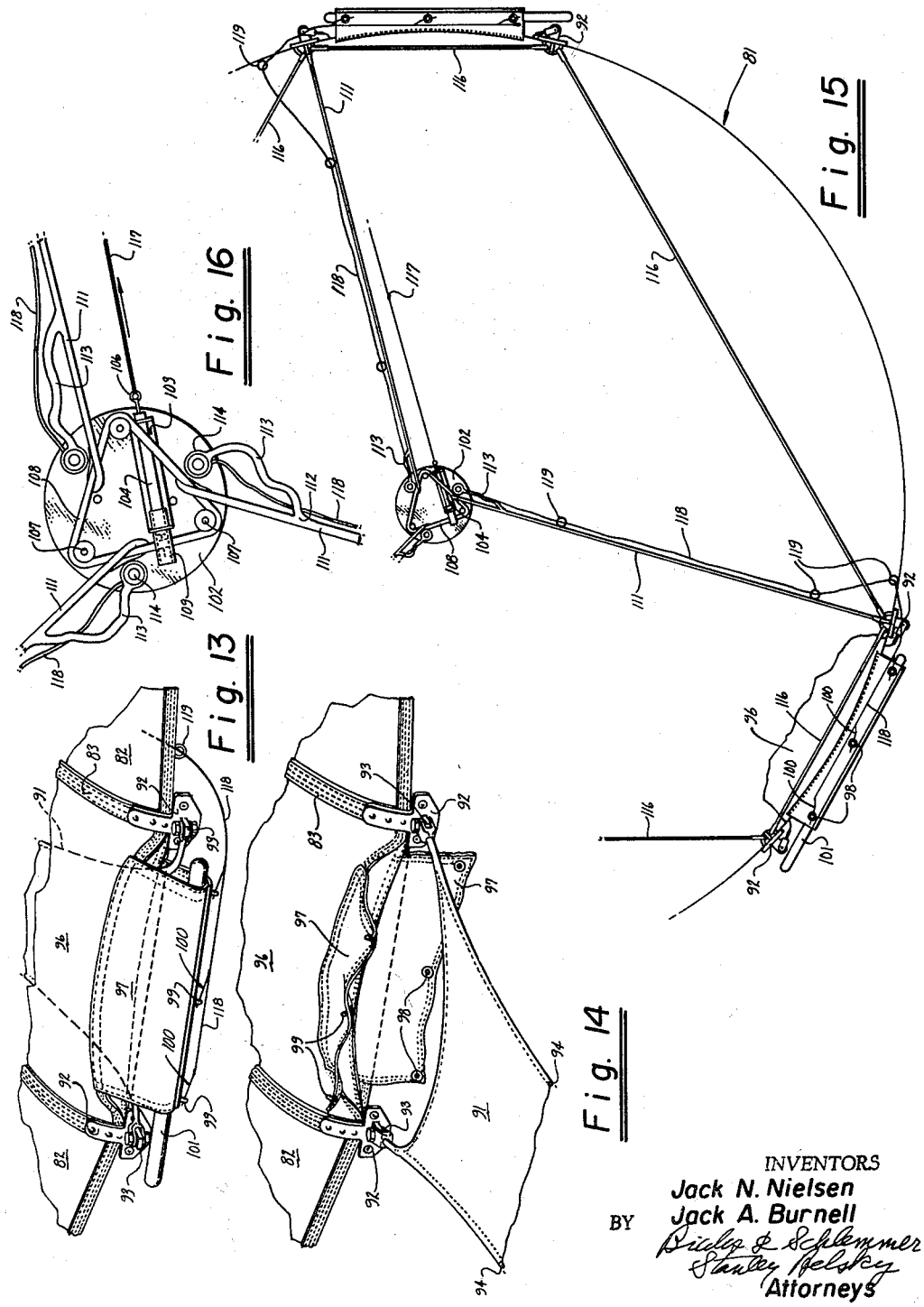

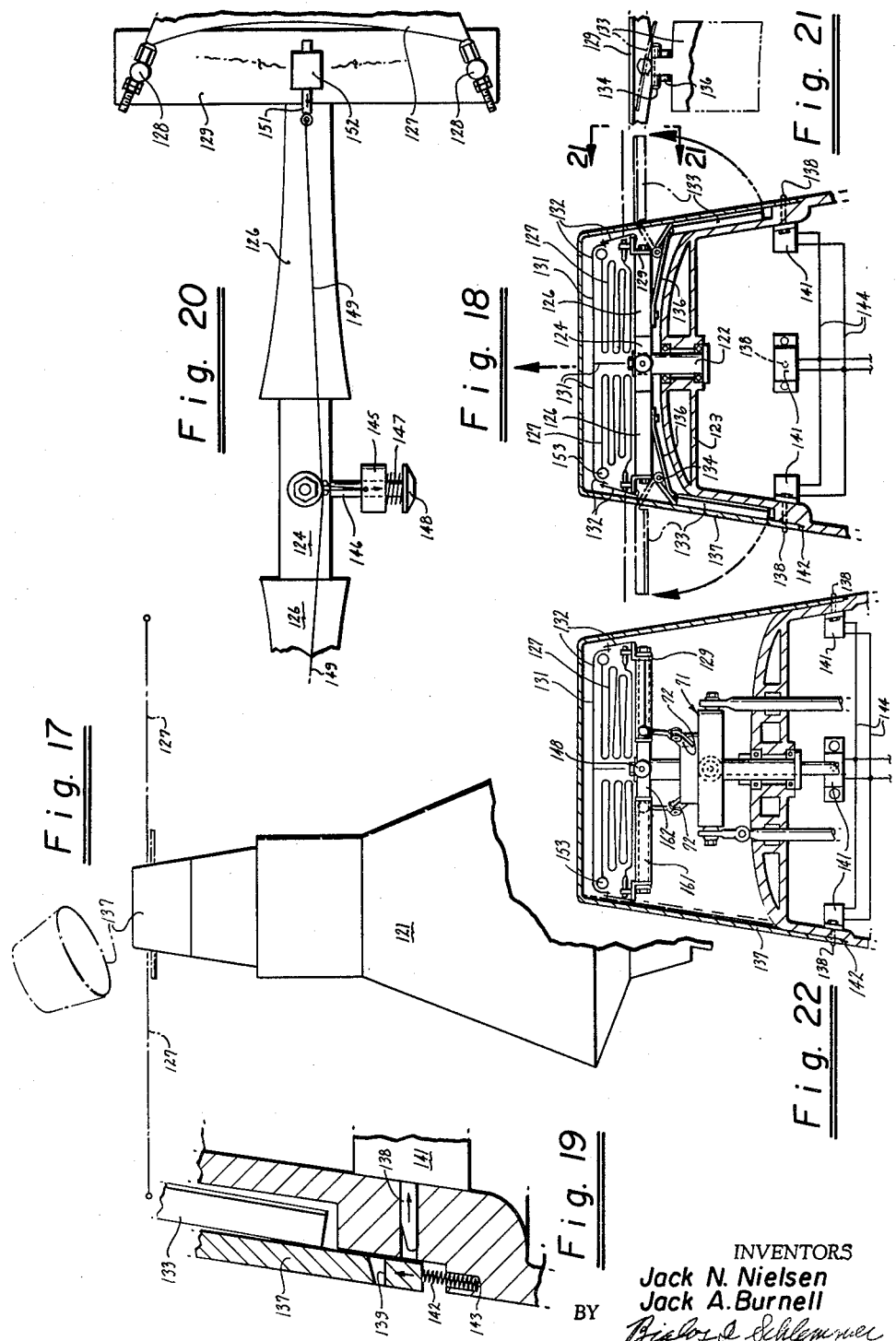

3,188,020
ROTOR BLADE AND AIR VEHICLES
EMBODYING SAME
Jack N. Nielsen, Los Altos Hills, and Jack A. Burnell, Mountain View, Calif., assignors to Itek Corporation, Lexington, Mass., a corporation of Delaware
Filed July 22, 1963, Ser. No. 296,535
15 Claims. (Cl. 244—17.25)

This invention relates to flexible rotor blades wherein the blade is entirely flexible both in spanwise and chordwise directions, and to air vehicles embodying such blade.

Flexible blades are known, which are formed of flexible membranes, such as fabric, having concave or in other words inwardly cambered leading and trailing edges comprising flexible cables or cords, such as steel wire, which provide tension members to which the membrane is fastened. In flight operation, weight means at the tip ends of the leading and trailing tension members place them under spanwise tension by virtue of centrifugal force acting on the weight means during rotation of the blades; and this combined with their concave curvature enables the tension members to support chordwise tension in the membrane. The chordwise tension in the membrane is in turn developed by the aerodynamic forces acting on the membrane; and the membrane inflates, analogous to a sail, with its center of curvature below the local blade section when lift on the local section is upward.

Because of the nature of such flexible airfoil, the problem of luffing exists; the luffing being analogous to the luffing or fluttering of a sail which occurs when a sailboat is tacked too closely into the wind. Luffing is also known as "camber flutter" or "chordwise instability"; and if occurring, even for a short time, it may result in loss of lift and serious damage to the blade with consequent danger to the vehicle on which the blade may be operating.

Summarizing this invention, it has as its objects, among others, the provision of a blade construction of the type described which is of a special planform shape determined by a particular relationship of the chord length at any spanwise point on the blade to the dynamic pressure and chordwise tension at such point so as to preclude luffing irrespective of the speed of rotation of the blade, wherein a multitude of practical planform shapes of the membrane and curvatures of the leading and trailing blade edges are possible while maintaining such relationship to adapt the blade for various uses in accordance with the type of air vehicle with which it is to be employed, which is of economical and simple construction, and which can be readily employed with different types of air vehicles. Other objects will become apparent from the following more detailed description of the invention, and accompanying drawings in which:

FIG. 1 is a plan view of a flexible blade, illustrating a particular planform shape, parts being broken away to illustrate the construction more clearly;

FIG. 2 is a plan view similar to FIG. 1 of another particular but different planform blade shape;

FIG. 3 is a section taken in a plane indicated by line 3—3 in FIG. 1, illustrating the camber the blade membrane assumes in flight;

FIG. 4 is a fragmentary side elevational view, partly in section to illustrate the construction more clearly, of a form of rotor hub construction on which the flexible blade hereof is mounted;

FIG. 5 is a horizontal sectional elevation of the construction shown in FIG. 4, taken in planes indicated by line 5—5 in FIG. 4;

FIG. 5A is an enlarged fragmentary sectional view of a portion of the structure shown in FIG. 5;

FIG. 6 is a horizontal view, partly in section, illustrating and adjustable weight mass connectable to the tip of the flexible rotor blade;

FIG. 7 is a vertical section illustrating the manner of connecting the adjustable weight mass to the blade; the planes of the view being indicated by line 7—7 in FIG. 5;

FIG. 9 is an isometric view illustrating flexible blades employed in combination with a rotating parachute;

FIG. 10 is a plan view of the underside of the parachute with the blades projected;

FIG. 11 is a top plan view of the parachute;

FIG. 12 is a section taken in a plane indicated by the line 12—12 in FIG. 11, illustrating how a flexible blade is contained in an automatically openable pocket secured to the parachute;

FIG. 13 is a fragmentary and elevational view showing the pocket arrangement with a blade enclosed therein when not in operation;

FIG. 14 is a similar view with the pocket open and the blade projected therefrom in operative position;

FIG. 15 is a fragmentary plan view illustrating the line arrangement enabling automatic projection of the blade;

FIG. 16 is an enlarged view of the central portion of the rip cord actuating arrangement, illustrating how a conventional parachute reefing line cutter is employed therein;

FIG. 17 is a schematic side elevational view of a recoverable rocket capsule employed with the flexible blades hereof; the operative position of the blades being shown in phantom lines, and an ejectable cover for enclosing the blades when in inoperative position being also illustrated in phantom lines;

FIG. 18 is a vertical cross-sectional view of the head of the capsule illustrating how the blades are housed therein, and the means for automatically enabling them to be projected into operative position;

FIG. 19 is an enlarged fragmentary vertical sectional view of a portion of the structure shown in FIG. 18 illustrating the manner of detachably latching the ejectable cover on the capsule;

FIG. 20 is a fragmentary plan view illustrating mechanism for enabling delayed automatic projection of a blade into operative position;

FIG. 21 is an elevational view taken in a plane indicated by line 21—21 in FIG. 18 with the canopy of the capsule omitted.

FIG. 22 is a view similar to FIG. 18 illustrating a modification embodying cyclic and collective pitch control mechanism for the blades.

Figure 8:
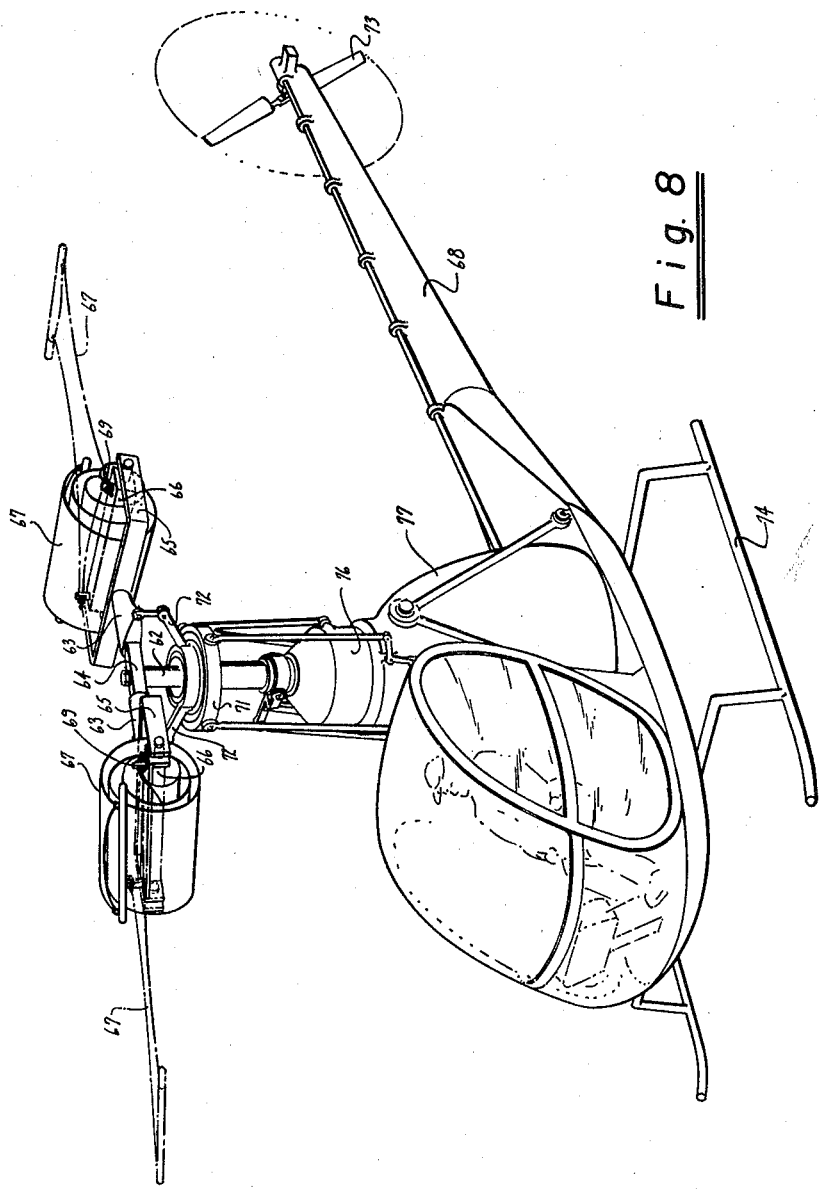
FIG. 8 is a more or less schematic isometric view illustrating a helicopter having the usual collective and cyclic pitch control mechanism to which the blades of this invention are connected; the blades being shown rolled up, and their extended position being illustrated in phantom lines.

Referring to FIG. 1, the blade is formed of two elongated flexible tension members 2 and 3 of any suitable strong material, such as flexible steel cable, it being immaterial which is the trailing or leading edge but for reference cable 2 may be designated as the leading edge. Looped over the cables and secured thereto by any suitable means, such as stitching 4, is a flexible membrane 6 of any suitable strong imperforate flexible sheet material, such as nylon. The shape of the membrane and length of the cables are such as to provide inwardly curved or in other words concave leading and trailing edges 7 and 8, respectively, the curvature of which is determined in a manner to be explained later.

At the left of FIG. 1, the end portions of cables 2 and 3 are secured in a conventional manner to adjustable cable terminals 2' and 3', respectively, in turn secured to a rotor column or equivalent, not shown in FIG. 1. The axis of rotation of the rotor column is to the left of FIG.

1 and is indicated by reference character A in FIGS. 1 and 4 for explanation of certain radial relationships to be explained subsequently in determining the curvature of the leading and trailing edges 7 and 8. At their tip ends, the cables 2 and 3, are rigidly and firmly connected to clevis members 9 and 11, respectively, which are connectable to weight means indicated by $W_1$ and $W_2$, the function of which is also explained in greater detail later. The planform shape of the blade in FIG. 2 is different, and is shown merely to exemplify by comparison with FIG. 1 that to achieve the invention, the blade planforms need not be similar as a multitude of shapes which will satisfy the conditions of a non-luffing blade, are possible. Since the blade construction shown in FIG. 2 is, otherwise, the same as that of FIG. 1, the same reference numerals are applied to the corresponding parts.

Certain factors are involved in providing the non-luffing blade of the invention, and they are indicated on FIG. 1 for reference. Based upon mathematical analysis and confirmed by many wind tunnel tests, it has been determined pursuant to this invention that in order to obtain such non-luffing blade, the following relationship must exist at any given point spanwise of the blade:

$\dfrac{T_0}{qc}$ must be greater than ($>$) approximately 1.72, wherein:

$T_0$ = chordwise tension at such point in lbs. per foot of span;
$q$ = dynamic pressure at such point in lb./ft.$^2$, and
$c$ = chord length at such point in feet.

The above formula applies for any unit length, such as feet, inches or centimeters, as long as all units used are the same but the foot unit is expressed in accordance with usual engineering practice. The factor $q$ is the well known air stream impact or ram pressure conventionally measured by air speed head, such as by a Pitot-static tube.

As expressed by the formula, the relationship is critical; and at any given point spanwise of the blade, the value 1.72 cannot be materially less although it may under some circumstances be about 1 to 2% less. Such value is independent of the character of the material of the membrane and the tension members 2 and 3. For safety factor reasons and to obtain practical lift coefficients, the value of the relationship should be at least 2 for angles of attack of 3° or greater.

Referring to FIG. 3 wherein the lift is indicated by L and the chordwise tension at any given point by $T_0$, the following is a simple physical explanation of the above criterion. The airfoil section shape and the chordwise tension $T_0$ must be such that the vertical component of such tension at both the leading and trailing edges can overcome the lift L developed by the camber of the airfoil section. If the tension is materially less than the critical value 1.72, the shape must change so that force equilibrium can be attained. In other words, the airfoil section must deform so that it does not develop the full value of lift; and the airfoil membrane 6 either vibrates or reverses curvature at the leading edge 7.

Calculation of the blade planform to avoid luffing has to be made to obtain the above value at any given point spanwise of the blade. Such value is a function of several variables including the tip weights $W_1$ and $W_2$ in lbs. at the leading and trailing edges, respectively; the radius R in feet of the blade from the axis of rotation A to the outboard end or tip chord $c_t$ of the blade; the radius $r$ in feet from such axis of rotation A to any given chordwise point $c$; and the tip chord length $c_t$ in feet at the tip of the blade; all of which are included in the following second order differential equation which is required for such calculation:

$$\dfrac{d^2\left(\dfrac{c}{c_t}\right)}{d\left(\dfrac{r}{R}\right)^2} = K\left(\dfrac{c}{c_t}\right)\left(\dfrac{r}{R}\right)^2$$

wherein $c$, $c_t$, $r$, and $R$ are the values previously explained, and K is a cable-tension parameter expressed by the following formula:

$$K = \dfrac{1}{2}\left(\dfrac{T_0}{qc}\right)\rho(\text{rho})R^3\left(\dfrac{g}{W_1} + \dfrac{g}{W_2}\right)$$

wherein:

$\rho(\text{rho})$ = air density, in slugs/ft.$^3$
$g$ = acceleration of gravity (32.2 ft./sec.$^2$), and
$\dfrac{T_0}{qc}$ = the aforementioned chordwise tension parameter
$W_1$ = tip weight in lbs. at leading edge
$W_2$ = tip weight in lbs. at trailing edge.

Since it is required that $$\dfrac{T_0}{qc} > 1.72$$

for no luffing of the blade, a greater value, for Example 2, is assigned to this parameter. The air density $\rho(\text{rho})$ is given; and values are arbitrarily assigned to $W_1$ and $W_2$, and to the radius R of the rotor. This gives a numerical value to K when the equation therefor is solved.

The second order differential equation is then solved, desirably for practical purposes in a digital computor; and in such solution of the equation, values are also arbitrarily assigned in feet to the tip chord length $c_t$, and to the slope of the leading and trailing edges of the blade immediately at the tip chord end thereof, such slope being the tangent of the angle $\theta$ indicated in FIG. 1. It has been found pursuant to this invention that for all practical purposes the parameter K may be arbitrarily assigned any value between 40 to 60, inclusive. Hence tip end weights $W_1$ and $W_2$ may be arbitrarily chosen beforehand to give a value for K in the range noted.

Thus, in principle to obtain a suitable planform shape for the blade to satisfy the chordwise tension parameter of $$\dfrac{T_0}{qc} > 1.72$$

the engineer after first having made an approximation of the rotor radius R, length of the blade and airfoil surface area required for any particular use of the blade, assumes values for the tip weights $W_1$ and $W_2$, and the tip chord length $c_t$, and solves the second order differential equation, preferably by a digital computor to obtain a series of values for $c$ at numerous spanwise points spaced apart by short increments inwardly from the tip end of the blade; suitable increments being at distances of about 5% of the radial distance R.

If the blade does not turn out to have a practical planform shape for the particular use intended, then the equation is resolved by assuming different weights $W_1$ and $W_2$ until a practical planform shape is obtained. In this connection, it may be also required that the tip edge slope (angle $\theta$) may have to be adjusted, so that too small a chord length is not obtained medially of the blade, or too great a chord length at the inboard end of the blade.

With respect to the weights $W_1$ and $W_2$, their center of gravity as a whole should be forward of the 50 percent tip chord ($c_t$) location to preclude the possibility of torsional instability. In other words, such center of gravity C (FIG. 6) should be in front of the aerodynamic center of the tip chord, desirably about 25 to 30% forward.

As previously related, the non-luffing characteristic of the flexible membrane type blade is independent of rotational speed. In other words, if the blade will not luff at any speed, it will not luff at all speeds of operation of the rotor. Weights $W_1$ and $W_2$ may be independent weights connected to the respective clevis members 9 and 11 shown in FIGS. 1 and 2. However, it is desirable, and consequently preferred, that these weight means comprise a unitary weight mass extending along the chord tip and having an adjustable portion to vary the distribution of the weight as desired between the leading and trailing edges of the blade.

Such adjustable weight mass is illustrated in FIGS. 4, 5, 6 and 7 which also depict a form of rigid rotor hub construction on which the flexible blades hereof are mounted. The blade shown in these figures has a planform shape substantially identical to that of FIG. 1. Hence, the same reference numerals are applied to the corresponding blade parts shown in FIG. 1. The adjustable weight mass comprises a rigid bar 21 which may be of metal or any other suitable material, to which eyes 22 are rigidly connected adjacent the respective ends thereof. At the left end appearing in FIG. 6 corresponding to the $W_1$ leading edge weight tip, bar 21 has a reduced threaded portion 23 upon which is adjustably screwed an adjustable weight portion 24, desirable of heavier material than bar 21 to insure that the center of gravity C is forward of the blade center line. Portion 24 is rigidly held in any desired adjusted position by means of a set screw 26.

Connection of the adjustable weight mass 21 to the tip end of blade 6 is effected by means of the eyes 22. The leading edge eye 22, as can be seen from FIG. 7, is attached to clevis 9 by means of a removable but fixedly secured pin 27; the clevis 9 being a conventional cable terminal fixedly secured to the leading edge tension member 2. Trailing edge eye 22 is connected to trailing edge tension member 3 in a similar manner.

FIGS. 4 and 5 illustrate a rigid hub auto-rotatable rotor system adapted for lowering an object from an air vehicle, or for test purposes. The inboard end of each blade 6 is connected to a rotor column 31 which provides a body rotatable about rotor axis A and to which an object to be lowered can be attached by any suitable swivel member, such as shown at 87 in FIG. 9. Although a direct connection can be effected between the rotor column and the inboard end of the flexible blade in a power driven rotor system, it is advantageous to employ in an auto-rotatable system a relatively small substantially rigid auxiliary airfoil section 32 projecting outwardly between the rotor column and each blade. Each airfoil section 32 can be of any suitable conventional construction wherein the airfoil section is inflexible chordwise but may have limited flexibility spanwise. These auxiliary airfoil sections 32 are desirable in an auto-rotatable system to enable sufficient speed of the rotor for projection of flexible blades under the action of centrifugal force.

Each section comprises end closures 33 rigidly secured to a tubular shaft 34 which is in turn journalled for pitch adjustment about a rotor hub bar 36; the airfoil skin 37 being desirably of metal and secured to end closures 33 with the trailing edges secured together by suitable means, such as rivets 38. Rotor hub bar 36 is in turn rigidly secured to the top of rotor column 31 which has a reduced threaded portion 39 upon which bar 36 is screwed and tightly held by locknuts 41.

Means is provided to mount the inboard end of each flexible membrane type blade 6 adjacent the outboard end of an associated auxiliary airfoil section 32, comprising an angle bar bracket 42 the vertical flange 42' of which is secured by suitable means, such as welding, to short tubular shaft 43 journalled on rotor hub bar 36 and abutting the outer end of the auxiliary blade section tubular shaft 34. The inner end of shaft 34 abuts a stop shoulder 45 on hub bar 36. Thus, both the bracket 42 to which the flexible blade is connected in a manner to be described and the auxiliary airfoil section 32 are each individually adjustable as to pitch about bar 36; and these parts are fixedly held in a desired adjusted pitch position by means of locknut mechanism 46 which clamps the entire assembly against stop 45.

Journalled for free swiveling movement on each horizontal flange 47 of each bracket 42 is a pair of upright swivel pins or lugs 48; each pin being retained by a locknut 49, which although holding the lug, nevertheless permits swiveling thereof. The inboard ends of the respective leading and trailing blade edge tension members are fixedly secured in apertures in the lugs by means including the adjustable cable terminals 2' and 3', and locknuts 51.

From the preceding, it is seen that each rotor blade assembly includes an outer flexible membrane type rotor blade and an inner substantially rigid auxiliary airfoil section, both of which are mounted for idependent pitch adjustment about a spanwise axis for independent adjustment of the angle of attack of either the auxiliary airfoil section or the flexible blade. The independent adjustment of the auxiliary airfoil sections permits a suitable angle of attack for obtaining a suitable rotational speed for outward projection of the flexible blades under centrifugal force; and the swivel members 48 supported by bracket means 42 provide a floating mounting for the inboard end of each flexible blade to permit proper shaping of the flexible blade root or inboard end as the blade lifting forces vary with varying operating conditions. Although a two-bladed rotor system is illustrated in FIGS. 4 and 5, the described type of rotor system can comprise any conventional number of blades, such as three or four.

In the rotor system of FIGS. 4 and 5, the flexible membrane type blades 6 are desirable of the previously described planform shape so as to preclude luffing and thus insure safety of the craft. However, it is to be understood that insofar as the particular rotor construction is concerned, such as the inboard swivel mounting of the flexible blades, and the association of each blade with an auxiliary substantially rigid airfoil section, the flexible blade can be of any other planform shape as long as it is flexible at least spanwise and desirably both spanwise and chordwise. This also applies to other embodiments of the invention subsequently described.

FIG. 8 illustrates substantially the same type of two-bladed rotor blade system of FIGS. 4 and 5 in combination with a helicopter having a power driven rotor column 62 to which substantially rigid pitch control sections 63 are journalled on a rotor hub bar 64 in the manner previously described with respect to the auxiliary airfoil sections 32 of FIGS. 4 and 5. A bracket 66 is connected to the outboard end of each section 63 so that when a section 63 is turned angularly on rotor hub bar 64, bracket 66 will turn with it. Bracket 66 is of substantially the same character as bracket 42 previously described but is journalled for turning within a support yoke 65 in turn fixedly attached to section 63 to enable automatic rolling of a flexible membrane type blade 67 connected to each bracket 66 for the purpose of preventing the blades striking parts of the helicopter, such as tail boom 68, when rotation of the rotor is initiated or when the rotor is stopped.

Suitable means for enabling the blades to roll up automatically when not in use is well known as is shown, for example, in the expired patent to Andrews No. 2,330,803, dated October 5, 1943. The inboard end of each flexible blade 67 is connected to the outboard end of a pitch control section 63 by means of swivel members 69 mounted on bracket 66 in the manner previously described. Hence, each blade is pitch adjustable by turning of an associated section 63.

Pitch adjustment is imparted to the blades by any convention pilot controlled means to actuate a conventional swash plate or wobble mechanism assembly 71 connected to suitable linkage 72 in turn connected to the blade pitch control sections 63. Otherwise the helicopter is of more or less conventional construction which includes tail rotor 73 and landing gear 74; the drive to the rotor column 62 being through transmission gearing 76 driven by a prime mover in shroud 77.

In operation of the helicopter, when the rotor reaches a speed at which there is sufficient centrifugal force to unfurl the rolled-up flexible rotor blades and project them outwardly, they will assume the position shown in dotted lines in FIG. 8 whereupon the ship can be flown. When the craft has landed after flight and the power is turned off, the blades will automatically roll up to their inoperative position shown as the rotor reduces speed, thus precluding their striking parts of the helicopter which might otherwise occur should the blades hang loose from the outboard ends of auxiliary airfoil sections 63. Although the arrangement is shown in combination with a helicopter, it can be employed on an autogiro which is another type of rotary wing aircraft wherein the rotor system is journalled for free auto-rotation at substantially all times; the power being supplied by means of a usual power driven traction propeller.

Another embodiment of the invention is illustrated in FIGS. 9 through 15 wherein the flexible membrane type rotor blades are employed in combination with a rotating parachute to provide an auto-rotatable system for lowering objects from air vehicles, in which added lift occurs by virtue of the blades as the parachute body falls and rotates through the air. Such type of parachute is well known as is shown and described in Ewing Patent No. 2,701,697, dated February 8, 1955. It comprises a generally circular canopy 81 formed of a plurality of panels 82 of any suitable light flexible fabric material, such as nylon, which are secured together and reinforced along their edges by suitable means such as flexible reinforcing tape 83 and stitching. As described in such patent, the panels are so arranged as to provide a plurality of triangularly shaped openings 84 adjacent the periphery of the canopy.

A central opening 86 is provided in the canopy, and a swivel unit 87 is connected to the canopy by means of flexible suspension lines 88 attached to the periphery of the canopy; the object 89 to be lowered being attached to the bottom of the swivel unit. In operation, when the parachute opens and falls through the air, canopy 81 provides a mass rotatable generally about the axis of the parachute which is coincidental with the center of central opening 86.

Desirably, at least three flexible membrane type blades 91 are provided spaced at equal angular distances about the periphery of the parachute when open although more equally spaced blades can be employed depending on the size of the parachute. As shown best in FIGS. 13 and 14, the inboard end of each blade 91 is connected to spaced metal brackets 92 fixedly secured to the periphery of the canopy. Each bracket is desirably provided with swivel pin connecting means 93 to which the leading and trailing edge tension members 94 are connected in the manner described with reference to FIGS. 4 and 5. However, insofar as the principle is concerned, other suitable connecting means may be employed although the described type of connecting means is advantageous for the reasons previously explained.

With reference to FIGS. 11 through 14, housing means is provided to enclose each blade in folded condition in a confined space when the blade is in inoperative position. Such housing means is readily disconnectable in a manner to be described to allow the blades to project outwardly under the action of centrifugal force, and comprises for each blade a flexible bag 96 of suitable material, such as nylon, fixedly secured to the top of the parachute canopy by stitching. The upper and lower peripheral edges of each bag have flexible flaps 97 secured thereto, which have conventional parachute rip cord pin fastenings comprising grommets 98, parachute cones 99, and pull pins 100 detachably securing the flaps at their outer edges when a blade is housed therein.

In the stored condition of each blade as indicated in FIGS. 12 and 13, the blade is folded once flat against the canopy with its tip end weight mass 101 at the periphery and retained by the disconnectable flaps. From the preceding, it is seen that when the parachute is rotating and the rip cord pin fastenings are detached to free flaps 97, the blades 91 will automatically fly outwardly under the action of centrifugal force to assume an operative lift position shown in FIG. 9. A reefing system is provided for automatically disconnecting the releasable flaps 97 a predetermined time interval after the parachute has opened and reached a desired rotational speed sufficient to thrust simultaneously all the blades 91 outwardly under the action of centrifugal force; and means is also provided to stabilize and retain the proper shape of the parachute during such opening thereof and after the blades are in operation.

Referring to FIGS. 15 and 16, a circular support and cable anchoring plate 102 is centered under canopy 81 in a manner to be described. A reefing cutter support bracket 103 is secured to plate 102 and supports a conventional parachute reefing cutter 104 having a release pin 106. The reefing cutter is of a well known type containing an explosive charge and a time delay unit which cause actuation of the cutter a predetermined time interval after the release pin is pulled. A cover is preferably mounted on plate 102 to house the mechanism supported thereby but for purposes of clarity, the cover is not illustrated.

Passing around a plurality of pins 107 projecting from support plate 102 is a strong cable 108 of any suitable material, such as Dacron fabric, which passes through knife portion 109 of the reefing cutter and is adapted to be severed thereby after the release pin 106 is actuated. A plurality of cables 111, one for each blade and desirably of Dacron, is provided, with the inner end of each cable looped about cable 108 so as to be connected thereto. The outer end of each cable 111 is connected to a bracket 92 associated with each blade at the periphery of the canopy. These cables 111 are all of the same length but of less radial length than the maximum radius of the parachute, and are initially for the purpose of retaining the shape of the parachute after it commences rotation and prior to the blades being outwardly projected.

At its inner end, each cable 111 is fixedly attached at 112 to a so-called lazy leg cable portion 113, also desirably of Dacron, the inner end of which is fixedly attached at 114 to support plate 102; the lengths of all the lazy legs being the same. Thus, when cable 108 is severed by the reefing cutter, the inner ends of cables 111 become detached, but the lazy legs 113, which are connected to cables 111 and thus provide continuous cables, all of the same length, allow the parachute canopy 81 to expand to its full radial distance while still retaining the shape of the parachute.

At the same time, since cables 111–113 provide cable connections at the periphery of the parachute and adjacent the inboard ends of the blades, they also serve to relieve the canopy of large tension forces which occur when the blades are in operation. Conventional rigging lines 116 are also attached to all of the brackets 92 to cooperate in taking-up tension forces and in maintaining the parachute shape when it is fully radially expanded. Desirably, the relative sizes of the parachute radius and rotor blade root chord lengths should be correlated to permit the rigging cables 111 and 116 to carry all centrifugal forces in tension.

As previously related, reefing cutter 104 has a suitable delayed time interval after release pin 106 is actuated and before cable 108 is cut, desirably between five to ten seconds, to enable the parachute to arrive at a desired rotational speed before the cable is cut. Release of the reefing cutter release pin 106 is effected by means of a non-stretchable, desirably steel cable 117, connected to the pin and to the periphery of the parachute. The effective radial length of cable 117 is less than the radius of the parachute so that when the parachute opens beyond a certain radius, the release pin is pulled to actuate knife portion 109 of the reefing cutter a predetermined time interval after pulling of the release pin 106. It will be noted that only a single reefing cutter is employed; and when it cuts the single cable 108, disconnection of the closure flaps 97 for each blade is effected simultaneously for all the blades.

For this purpose, a non-stretchable, desirably steel, rip cord cable 118 is associated with each blade and is connected at its inner end to plate 102 at 114, and passes through reefing rings 119 some of which are connected to cable 111 and one to the periphery of the parachute. At its outer end portion, each rip cord 118 is connected to the aforementioned conventional pull pins 100, as seen in FIGS. 13 and 15. Each rip cord 118 is shorter than the maximum radius of the parachute so that when the parachute is opened to its fullest extent upon cutting of the control cable 108, the periphery of the parachute extends beyond the rip cord lengths and in so doing simultaneously releases all the conventional parachute rip cord pins 100 which hold the flaps 97 connected, thus allowing all the blades to shoot outwardly simultaneously under the action of centrifugal force.

From the preceding, it will be noted that release of all of the blades is effected simultaneously by the single reefing cutter 104 when the common control cable 108 is cut. This is important in maintaining proper balance about the center of rotation of the parachute which might not otherwise obtain were the blades to be released at different time intervals. If such balance were not obtained, the parachute might become damaged. Moreover, because of the delayed action of the reefing cutter after the cable 117 has been pulled, the blades are released simultaneously only after the parachute has reached a rotational speed sufficient to project all of the blades rapidly outwardly with great force, thus precluding any possibility of their becoming tangled.

FIGS. 17 through 21 illustrate a further embodiment of the invention in combination with a recoverable rocket capsule 121 wherein the blades are auto-rotatable to allow controlled descent and landing of the capsule with safety. A rotatable mass comprising freely rotatable rotor column 122 is supported for rotation on a bracket structure 123 at the top of the capsule. Connected to rotor column 122 in the manner described with reference to FIG. 8 is a rotor hub bar 124 fixedly connected to bracket support sections 126 in turn connected to flexible membrane type blades 127 having their leading and trailing edge tension members connected to swivel members 128 in the manner related previously. Each set of swivel members 128 is mounted on a support bracket 129 of the character previously described, which is fixedly secured to the outer end of an associated section 126. As shown in FIG. 18, in inoperative position, the blades are folded over the rotor hub bar and the sections 126, in housing means 131 having disconnectable flaps 132 detachably held together in the manner described with respect to the parachute embodiment.

The upper end of bracket structure 123 is recessed to receive airfoil vanes 133 which are pivotally attached at 134 to the underside of the outboard ends of sections 126. These vanes are thrust in an outward direction by leaf springs 136 also attached to the underside of sections 126. When the flexible blades are in inoperative position, the entire rotor assembly is enclosed in an releasably secured cover or canopy 137 which is latched in position by latch pins 138 engaged in apertures 139 in the canopy.

Each latch pin 138 is disengageable from an associated apertures 139 by a solenoid 141. A pularity of coil spring 142 is seated in recesses 143 formed in the capsule, and engage the under edge of canopy 137 to eject the canopy 137 completely free of the capsule, as shown in FIG. 17, when the latch pins 138 are released. It will be noted in this connection that when the canopy 137 is latched, it retains the vanes 133 in an inoperative position. However, when the canopy is released, the vanes which are connected to the rotor system as explained, are automatically thrust outwardly by spring 136.

As seen in FIG. 21, vanes 133 are inclined to the air stream, thus serving as an auto-rotatable means to impart rotation to the rotor system when the capsule falls through the atmosphere. Release of the latch pins with consequent ejection of canopy 137 and rotation of the rotor system by means of vanes 133 can be either pilot controlled or automatically controlled, through any suitable switch mechanism in the capsule for energizing solenoids 141 connected to suitable electrical wiring 144.

Means is provided for automatically disconnecting the housing means flaps 132 a predetermined time interval after the rotor vanes 133 have imparted sufficient rotational speed to the rotor system to cause the blades to become ejected forceably under the action of centrifugal force. As can be seen best from FIG. 20, such means comprises a weight 145 slidably mounted on a transversely extending bar 146 fixedly connected to rotor hub bar 124; a calibrated coil spring 147 being interposed between weight 145 and a stop 148 fixed to the end of bar 146.

For each blade, a non-stretchable cable 149 is connected to weight 145 and to a release pin 151 of a time delay reefing cutter 152 mounted on a bracket 129 which supports the blade. The reefing cutter is of the type already described and serves after release of pin 151 to disconnect automatically conventional rip cord pins connecting an associated set of flaps 132, thus freeing the blades and allowing them to project outwardly under the action of centrifugal force with their tip weights 153 forward. The coil spring 147 is so calibrated to allow the rotor to reach a sufficient rotational speed, which can occur only when vanes 133 work in thick enough atmosphere, before the reefing cutters are actuated. Thus this provides a safety factor should the canopy 137 become ejected in rarefied atmosphere in which the vanes 133 will not have sufficient bite.

FIG. 22 illustrates a recoverable capsule embodiment similar to FIG. 18, but with mechanism for imparting cyclic and collective pitch control to the flexible blades as in the helicopter embodiment of FIG. 8. The arrangement for releasably housing the flexible blades and automatically ejecting the capsule canopy is the same as in FIG. 18. Hence, the same reference characters are applied to the corresponding parts.

However, in the FIG. 22 embodiment, each flexible blade is secured by means of a bracket 129 to the end of a pitch control section 161 journalled for rotation about rotor hub bar shaft 162. Pitch is imparted to the blades by the same type of mechanism as in the FIG. 8 embodiment namely, a conventional wobble or swash plate mechanism 71 connected to linkage 72 in turn connected to the blade pitch control sections 161. Such pitch control can be either a pilot operable control means or any suitable automatic control mechanism, not shown. Although vanes similar to the vanes 133 in FIG. 18 can be employed to impart initial rotation to the rotor, any other suitable drive mechanism such as an electric motor in the capsule can be utilized to impart such initial rotation, which is automatically disconnectable after the rotor has reached sufficient initial speed.

We claim:
1. A flexible rotor blade comprising a flexible membrane, the leading and trailing edges of which are generally concave and have tensioning weight means adjacent said edges at the tip end of the blade, said weight means and the extent of concavity of said leading and trailing blade edges being such as to provide the following characteristic at any given point spanwise of the blade to preclude blade luffing in operation:

$$\frac{T_0}{qc} > \text{approximately } 1.72$$

wherein $T_0$ = chordwise tension at such point in lbs. per foot of span.
$q$ = dynamic pressure at such point in lb./ft.$^2$, and
$c$ = chord length of blade at such point in feet.

2. The flexible rotor blade of claim 1 wherein the leading and trailing edges of said membrane are connected to flexible tension members to which said weight means is attached.

3. A flexible rotor system comprising a body rotatable about an axis, a plurality of substantially rigid auxiliary airfoil sections connected to the body for rotation about said axis, a plurality of flexible rotor blades each of which comprises a flexible membrane secured to flexible tension members at its leading and trailing edges, said leading and trailing edges being generally concave and having tensioning weight means adjacent said edges at the tip end of the blade whereby camber is imparted to the blade in operation, and means mounting each of said blades adjacent the outboard end of a substantially rigid airfoil section comprising a pair of swivel members to which the inboard ends of said tension members are connected.

4. The rotor system of claim 3 wherein each airfoil section is mounted for pitch adjustment about a spanwise axis, bracket means is mounted adjacent the outboard end of such section, and said swivel members are supported by said bracket means.

5. A flexible blade rotor system comprising a body rotatable about an axis, a plurality of flexible rotor blades; each blade comprising a flexible membrane secured to flexible tension members at its leading and trailing edges, said leading and trailing edges being generally concave and having tensioning weight means adjacent said edges at the tip end of the blade whereby camber is imparted to the blade in operation; and means connecting the inboard end of each blade to said body including a pair of swivel members connected to the inboard ends of said tension members.

6. The system of claim 5 wherein said body is the rotor column of a rotary wing aircraft.

7. The system of claim 5 wherein said body is the rotor column of a helicopter, said swivel members are connected to the outboard end of a member journalled for turning about a spanwise axis and having its inboard end connected to the rotor column, and means is provided for turning such journalled member to impart pitch change to an associated flexible blade.

8. The system of claim 5 wherein said body is a rotating parachute.

9. The system of claim 5 wherein said body is a rotor provided in a recoverable rocket capsule.

10. An auto-rotatable sustaining system for an object adapted to fall through the air and including a rotatable mass; comprising a plurality of flexible membrane type rotor blades which can be housed in a confined space; means connecting the inboard end of each blade to said rotatable mass; disconnectable housing means supported by said mass for storing the blades in inoperative position; and means connected to said disconnectable housing means operable to disconnect the same and allow the blades to project outwardly under the action of centrifugal force.

11. The system of claim 10 wherein said housing means includes flexible flaps; and said means to disconnect said housing means includes a detachable connection securing said flaps, and mechanism for automatically detaching said connection.

12. An auto-rotatable sustaining system for a rotatable parachute having a canopy; comprising a plurality of flexible membrane type rotor blades which can be housed in a confined space; means connecting the inboard end of each blade to the canopy adjacent the periphery thereof; a pocket for each blade secured to the canopy in which the blade is storable in inoperative position; flaps for closing each pocket when the blade is stored therein, a detachable connection for securing the flaps of each pocket; and means for effecting automatic disconnection of such detachable connection after the parachute has opened and commenced to rotate to allow said blades to project outwardly under the action of centrifugal force.

13. An auto-rotatable sustaining system for a rotatable parachute having a canopy; comprising a plurality of flexible membrane type rotor blades which can be housed in a confined space, means connecting the inboard end of each blade to the canopy adjacent the periphery thereof, a pocket for each blade secured to the canopy in which the blade is housed in inoperative position, means including a detachable connection for each pocket for closing the same when a blade is housed therein, a member connected to each detachable connection to detach the same, and mechanism for effecting simultaneous actuation of all of said members to cause simultaneous disconnection of all of such detachable connections after the parachute has opened and commenced to rotate to allow said blades to project outwardly simultaneously under the action of centrifugal force.

14. The system of claim 13 wherein said mechanism includes a single delayed action reefing cutter common to all said members.

15. A flexible blade rotor system comprising a body rotatable about an axis, a plurality of flexible rotor blades; each blade comprising a flexible membrane secured to flexible tension members at its leading and trailing edges, said leading and trailing edges being generally concave and having tensioning weight means adjacent said edges at the tip end of the blade whereby camber is imparted to the blade in operation; and means providing a floating mounting for the inboard end of each flexible blade to allow shaping of the root end of the blade as blade lifting forces vary with varying operating conditions comprising an upright pin connecting the inboard end of each blade tension member to said body for swiveling movement about an upright axis.

References Cited by the Examiner

UNITED STATES PATENTS

| | | | |
|---|---|---|---|
| 2,089,140 | 8/37 | Tricau | 244—145 |
| 2,701,697 | 2/55 | Ewing | 244—145 |
| 2,969,211 | 1/61 | Von Saurma | 170—160.11 X |
| 3,117,630 | 1/64 | Barish | 170—160.5 X |
| 3,150,850 | 9/64 | Barish | 244—138 |

OTHER REFERENCES

"Theory of Flexible Aerodynamic Surfaces" (research paper by Nielsen), March 20, 1962. 27 pages.

FERGUS S. MIDDLETON, *Primary Examiner.*